(12) United States Patent
Saviharju et al.

(10) Patent No.: US 7,640,750 B2
(45) Date of Patent: Jan. 5, 2010

(54) APPARATUS AND METHOD FOR PRODUCING ENERGY AT A PULP MILL

(75) Inventors: Kari Saviharju, Espoo (FI); Jorma Simonen, Roswell, GA (US); Olli Arpalahti, Varkaus (FI); Lasse Koivisto, Varkaus (FI)

(73) Assignee: Andritz Oy, Helsinki (FI)

( * ) Notice: Subject to any disclaimer, the term of this patent is extended or adjusted under 35 U.S.C. 154(b) by 480 days.

(21) Appl. No.: 11/379,659

(22) Filed: Apr. 21, 2006

(65) Prior Publication Data

US 2006/0236696 A1    Oct. 26, 2006

Related U.S. Application Data

(60) Provisional application No. 60/674,288, filed on Apr. 25, 2005, provisional application No. 60/673,779, filed on Apr. 22, 2005.

(51) Int. Cl.
*F01K 7/34* (2006.01)

(52) U.S. Cl. .............................. 60/653; 60/677; 60/679

(58) Field of Classification Search .................. 60/653, 60/677–680
See application file for complete search history.

(56) References Cited

U.S. PATENT DOCUMENTS

| | | | | |
|---|---|---|---|---|
| 5,555,723 | A * | 9/1996 | Dowdy | 60/39.182 |
| 6,619,041 | B2 * | 9/2003 | Marin et al. | 60/653 |
| 6,647,726 | B2 * | 11/2003 | Saviharju et al. | 60/653 |
| 2004/0011484 | A1 * | 1/2004 | Saviharju et al. | 162/47 |
| 2004/0237862 | A1 * | 12/2004 | Oomura et al. | 110/348 |
| 2005/0252458 | A1 * | 11/2005 | Saviharju et al. | 122/17.1 |

* cited by examiner

*Primary Examiner*—Hoang M Nguyen
(74) *Attorney, Agent, or Firm*—Nixon & Vanderhye P.C.

(57) ABSTRACT

A spent liquor recovery boiler in the pulp and paper industry including a water/steam circulation system having superheaters, the circulation system connected to a steam turbine comprising a high-pressure part, and a furnace for burning spent liquor to produce flue gases, and including an upper portion through which the flue gases flow, wherein the steam/water circulation system of the recovery boiler is provided with a reheater for reheating steam from the high-pressure part of the turbine.

24 Claims, 1 Drawing Sheet

APPARATUS AND METHOD FOR PRODUCING ENERGY AT A PULP MILL

This application claims the benefit of U.S. Provisional Application Nos. 60/673,779 filed Apr. 22, 2005 and 60/674,288 filed on Apr. 25, 2005. The entirety of these applications is incorporated by reference.

BACKGROUND

The invention relates to a spent liquor recovery boiler comprising a water/steam circulation system having superheaters and reheaters, and a furnace for burning spent liquor to produce hot flue gases, and including an upper portion through which the flue gases flow. The water/steam circulation system is connected to a steam turbine comprising a high-pressure stage and a medium-pressure stage. Live steam superheating and steam reheating are performed utilizing an arrangement with which corrosion can be reduced.

In chemical pulp mills, the cooking chemicals of a pulping process are recovered from spent liquor, e.g., black liquor in kraft pulping, by firing the liquor in a recovery boiler either alone or together with other "waste" streams. The firing process is exothermic and the released energy is recovered as pressurized superheated steam. The steam energy is recovered in a steam turbine in the form of electric power and steam of different pressures for process needs. Kraft pulping which produces black liquor is the dominant pulping method and is used herein to describe the invention. The invention may be applied in various types of chemical pulp mills and other processes. While the term "black liquor" commonly used in the context of kraft pulping, it is also used herein to refer to all types of spent liquors.

Traditionally, energy is produced in a pulp mill by combusting black liquor in a recovery boiler, and wood wastes and bark in an auxiliary boiler. The bark of the wood raw material and the organic substance of generated black liquor together normally fulfill the entire energy demand of the pulp mill. If more energy is needed in the pulp mill, additional fuel may be purchased. The additional fuel is combusted with the wood bark in an auxiliary boiler. For example, a lime kiln may be fired with oil or with natural gas. At the present time, the production of power often takes place as follows: (i) the recovery boiler and the auxiliary boiler, in which the bark generated in the mill is combusted, produce superheated high-pressure steam; (ii) The produced steam is fed to one or more back pressure steam turbines and the steam from the turbine discharge provides heat for the mill, and (iii) The turbine and the generator connected thereto produce the electricity needed by the mill. Electricity is usually produced by a back pressure turbine having one or more bleedings. The back pressure used is 3-6 bar (abs.) and the bleed pressure 8-16 bar (abs.). The production of electricity may also be effected by means of a condensing turbine or by a condensing stage in the steam turbine, following the back pressure stage.

Wood contains small amounts of potassium (K) and chlorine (Cl). These elements remain in the black liquor during cooking. They may enter black liquor also via make-up chemicals, or via internal connections inside the mill. In the recovery boiler, these elements are enriched into the fly ash and increase the corrosiveness of the flue gas especially in the superheater.

The corrosiveness of Cl and K increase with temperature. The corrosiveness of Cl and K impose an upper temperature limit on the steam generated in the recovery boiler. This limit for the superheated steam temperature is typically 400° C. to 490° C., depending on the content of chlorine and potassium. With special materials or with liquors having a very low Cl and K content, either naturally or via fly ash dumping or via Cl and K removal process, steam temperatures up to 520° C. have been used. Because the corrosiveness of Cl and K generally require the temperature of the superheated steam to be held relatively low, the steam pressure is also low. These temperature limitations result in low power yield from the heat generated in the recovery boiler, compared to normal power boilers fuelled by coal, natural gas or oil.

The temperature limitations of 400° C. to 490° C. and 520° C. on the steam in a recovery boiler are not as strictly valid with bark originating from logs, but the fly ash from bark combustion in a bark boiler may also contain chlorine and potassium. As the sulfur content of bark is very low, chlorine reacts in the bark boiler with metals, which in turn may result in superheater corrosion. Calorimetric flow in bark is also much lower than in the black ("waste") liquor flow, due to much smaller mass flow. This depends on pulp yield in pulping, and the amount of bark in the wood, from which the pulp is made.

WO 03/104547 and corresponding U.S. Published Application 2005/0252458 disclose a system for increasing the temperature and pressure of superheated steam produced at a recovery boiler plant of a pulp mill in such a way that no corrosion occurs or the rate of corrosion is at acceptable levels. WO 03/104547 and corresponding U.S. Published Application 2005/0252458 disclose a system in which the recovery boiler is provided with at least one cavity having walls formed of water-cooled tubes connected to the water/steam circulation system of the recovery boiler. The interior of the cavity is provided with a heat exchanger for final superheating of the steam generated in the recovery boiler, whereby the heat exchanger is connected to the superheaters of the boiler. The cavity is heated by burning fuel in such a manner that non-corrosive conditions in the superheater cavity are guaranteed. The fuel can be a gas produced by gasifying biomass. The basic feature of this system is that at least one combustion cavity is provided in connection with a recovery boiler for the final superheating of steam produced in the superheater section of the recovery boiler.

SUMMARY

A system is disclosed herein for increasing the power yield in energy production at a pulp mill in such a way that corrosion problems can be minimized. The disclosed system should improve the yield, e.g., the overall electrical efficiency of the recovery boiler and the steam turbine assembly.

A feature of the disclosed system is that the steam/water circulation system of the recovery boiler is provided with a reheater for reheating steam coming from the high-pressure part of the turbine.

The reheater comprises a first part and a second part, wherein the first part is located in the flue gas flow produced in the furnace of the recovery boiler and the first part is connected to steam outlet of the high-pressure part of the turbine.

The recovery boiler is preferably provided with at least one cavity as described in the above-mentioned WO publication No. 03/104547 naming the same inventors, and which is fully incorporated herein by reference. The number of cavities can be greater than one, for instance two. The second part of the reheater(s) is located in the interior of the cavity. The second part of the reheater(s) is connected to the first stage of the reheater and to the turbine, preferably to a steam inlet of the medium-pressure part of the turbine. The cavity comprises means for combusting a fuel and at least one outlet for discharging flue gases to the recovery boiler. The flue gases from the cavity can either be mixed to flue gases from the main furnace, in high temperature, or the cavity flue gases may have an own route to atmosphere. If the route is independent of the main flue gas flow route, the cavity flue gases can after cleaning be used, such as for drying pulp etc., basically for the same purposes as gases originating from burning natural gas.

The interior of the cavity can also be provided with a superheater for final superheating of the steam generated in the recovery boiler. According to another embodiment, the final superheating and the reheating are performed in different cavities. For purposes of illustration, only one cavity is described hereinafter but the cavity may be implemented as a plurality of cavities.

According to the system disclosed herein, a reheater for reheating steam from the turbine is provided in connection with a recovery boiler. Live steam is produced in the superheater section of the recovery boiler and then expanded in the high pressure stage (HPT) of the turbine to 250-400° C. The steam is exhausted from the high-pressure stage of the turbine, and returned to the boiler where its temperature is increased in the reheater to 450-600° C., preferably to 520-560° C. Preferably the steam is reheated in two stages. The first stage of the reheater is located in the conventional superheater section of the recovery boiler. In this first stage, the steam expanded in the turbine is reheated by the flue gases generated in the furnace of the recovery boiler, typically to 450-540° C., preferably to 450-500° C. The partially reheated steam is led to the second stage of the reheater, in which it is finally reheated to 480-600° C., preferably to 490-560° C.

The system can also be such that live steam from a lower pressure auxiliary boiler, or from heat recovery is either fed into the high pressure stage of the steam turbine between the feed of the live steam and the outlet of the turbine, or mixed with steam from the high pressure stage of the turbine before the steam enters the reheater. For this part of steam, the reheater is a stage of final superheating. Mixing can take place also in the reheater, if the temperatures of the steams to be mixed are approximately the same.

The reheated steam is led from the second stage of the reheater to a medium-pressure stage (MPT) of the turbine, in which it is expanded down to back pressure. If the turbine has a condensing part, then the steam is expanded down to condensing pressure, partially or totally.

According to an embodiment of the system disclosed herein, the recovery boiler is provided with two reheaters, one for reheating steam from the high pressure part of the turbine, and the other for reheating steam from the first intermediate part of the turbine. Thus the steam cycle has to comprise two reheaters. This requires high steam pressure, as in utility steam cycles. Recovery boilers differ from utility boilers in the arrangement needed for preventing corrosion in the hot parts of the superheater and the reheater(s). If two reheaters exist in the steam cycle, each reheater preferably has two stages as described above. Also here, steam from an auxiliary boiler, or from heat recovery can be mixed into cold steam entering the reheater.

The system allows that the steam extracted from the high pressure stage of the turbine to be first heated in the reheater part located in the conventional superheater section of the recovery boiler into such a degree that high temperature corrosion does not substantially take place, below 500° C., and after that the steam is finally reheated to 480-600° C., optimally to 490-560° C. in the combustion cavity, which serves as a final reheater. The fuel burned for the final reheater(s) is such that it does not cause high temperature corrosion.

The superheater cavity for the final reheating of the high pressure turbine exhaust steam is preferably heated by burning fuel in such a manner that non-corrosive conditions in the superheater cavity are guaranteed. The fuel can be a gas produced by gasifying biomass. The corrosion of heat surfaces can be avoided by additional combustion of sulfurous fuel. Also the cleaning of the gas before the combustion in the superheater cavity guarantees non-corrosive conditions at higher temperatures. Instead of the gas produced from biomass, other fuels can be used, e.g. natural gas, LPG, liquefied biomass, methanol, etc. The criterion for the fuel is the non-corrosive nature under the cavity conditions.

The fuel combustion in the cavity is normally complete with optimized amount of excess air, but stoichiometric or reducing conditions are also possible, if preferable. A preferred embodiment is to burn the fuel with high excess air to generate high temperature combustion air for the main furnace. The combustion itself can be staged, but the flue gas flow generated in the cavity has high excess air factor. In this option the flue gas flow is led to the main furnace via several ports, which can be located on different heights.

The walls of the superheater cavity are designed as water-cooled heat transfer surfaces, which are connected to the main water/steam circulation system of the recovery boiler through connection pipes for the incoming water/steam-water mixture and outgoing water/steam-water mixture. Thus, the heat surfaces form a part of the main water system of the recovery boiler. The main water system and consequently the water system of the superheater cavity can be of natural circulation type or forced circulation or so called once-through, the last-mentioned being typical for the highest steam/water pressures. In natural circulation boilers this means that cooling water is fed via downcomers from a drum down to headers feeding the walls of the cavity or cavities, and water-steam mixture from these walls is collected and fed into the drum. The cavity can have separate walls of its own, but part of the walls of the cavity or part of the walls of the cavities can be common with the "conventional" part of the recovery boiler.

According to another embodiment of the system disclosed herein, the interior of the cavity is further provided with means for heat transfer from the flue gases produced in the cavity to the steam flowing in the heat exchanger means. The heat exchanger means serve as a final superheater for the steam generated in the superheater section of the recovery boiler. The final superheated steam is fed to the turbine.

The system allows that the steam produced in the recovery boiler to be heated in the conventional heat transfer sections, e.g., economizers, boiler bank, and superheaters, of the recovery boiler into such a degree that high temperature corrosion does not substantially take place, i.e. below 540° C., optimally 480-520° C., and after that the steam is finally superheated to 500-600° C., optimally to 520-560° C. in the combustion cavity, which serves as a final superheater. The recovery boiler system can be provided with one or more final superheater (cavities).

The liquor combusted in the recovery boiler may originate from all types of pulping processes, utilizing all types of fiber raw material. Sulfur-free waste liquor, or liquor with almost zero Cl and K content gives special advantage, because it would allow to use high pressure in the water cooling system of the furnace and the utilization of high live steam temperature and reheat steam temperature already in the main flue gas flow. For instance, when sulfur-free liquor is burned, the highest steam temperatures could be in the main flue gas flow. Sulfur-free spent liquor is formed in e.g. a soda pulping process and a soda-anthraquinone pulping process.

A preferable location for the cavity is the front wall, which is opposite to the "bullnose" wall, but the cavity can be built on sidewalls too, either as one cavity, or as several cavities. The location or locations of the cavity or the cavities can be in the vertical direction anywhere, in relation to the conventional part of the boiler, limited only by the cooling water circulation.

The superheater cavity for the final superheating of the recovery boiler steam is heated by burning fuel. A burner or burners for the fuel are located at the top of the cavity, at the bottom of the cavity, or on the walls of the cavity. The cavity can also be located in a horizontal position, when the most preferred location for the burner or the burners is on one end wall of the cavity.

The combustion air system of the superheater cavity is a part of the combustion air system of the recovery boiler. It may also have a separate air system with an air fan of its own, connection ducts between the fan and the burner(s) and any necessary equipment for the combustion air control.

The flue gases from the superheater cavity are led into the recovery boiler, preferably to the inlet of the main superheater, where they are mixed with the main flue gas stream coming from the furnace. Other locations for the gas connection are possible as well such as the whole area from the lower part of the furnace to the inlet of the economizer. The offgas connection through the boiler wall comprises preferably more than one opening, and one possibility is to design the combustion system of the cavity in such a way that excess combustion air is fed to the cavity. This air is heated in the cavity, and then it flows together with the cavity's flue gases to the main furnace to be used in the combustion system of the main furnace. In this option, the preferred solution requires two cavities on opposing walls, preferably on the front and rear walls. The first superheater and the final reheater could then be located in separate cavities. The gas flows from the cavities can take place via several ports, which are arranged on several heights. The ports can have control devices for controlling the location of outflowing flue gas/air mixture, which allows for controlling, whether the cavity's flue gases are used for heating live steam or reheater steam. If the final superheater and the final reheater are located in the same cavity, the control system could be used for controlling steam temperatures, as such or as part of the whole control system.

With the disclosed system, the pressure and the operating temperature of the steam extracted from a high-pressure part of a turbine is increased by means of a two-stage reheater, and the steam thus reheated is expanded in the medium pressure part(s) of the turbine, whereby more electricity is generated, i.e. more power is generated by the heat recovered into the steam.

SUMMARY OF THE DRAWING

The invention will now be described in more detail with reference to the accompanying drawing, in which one embodiment of the invention is illustrated.

DETAILED DESCRIPTION OF THE DRAWINGS

Figure 1:
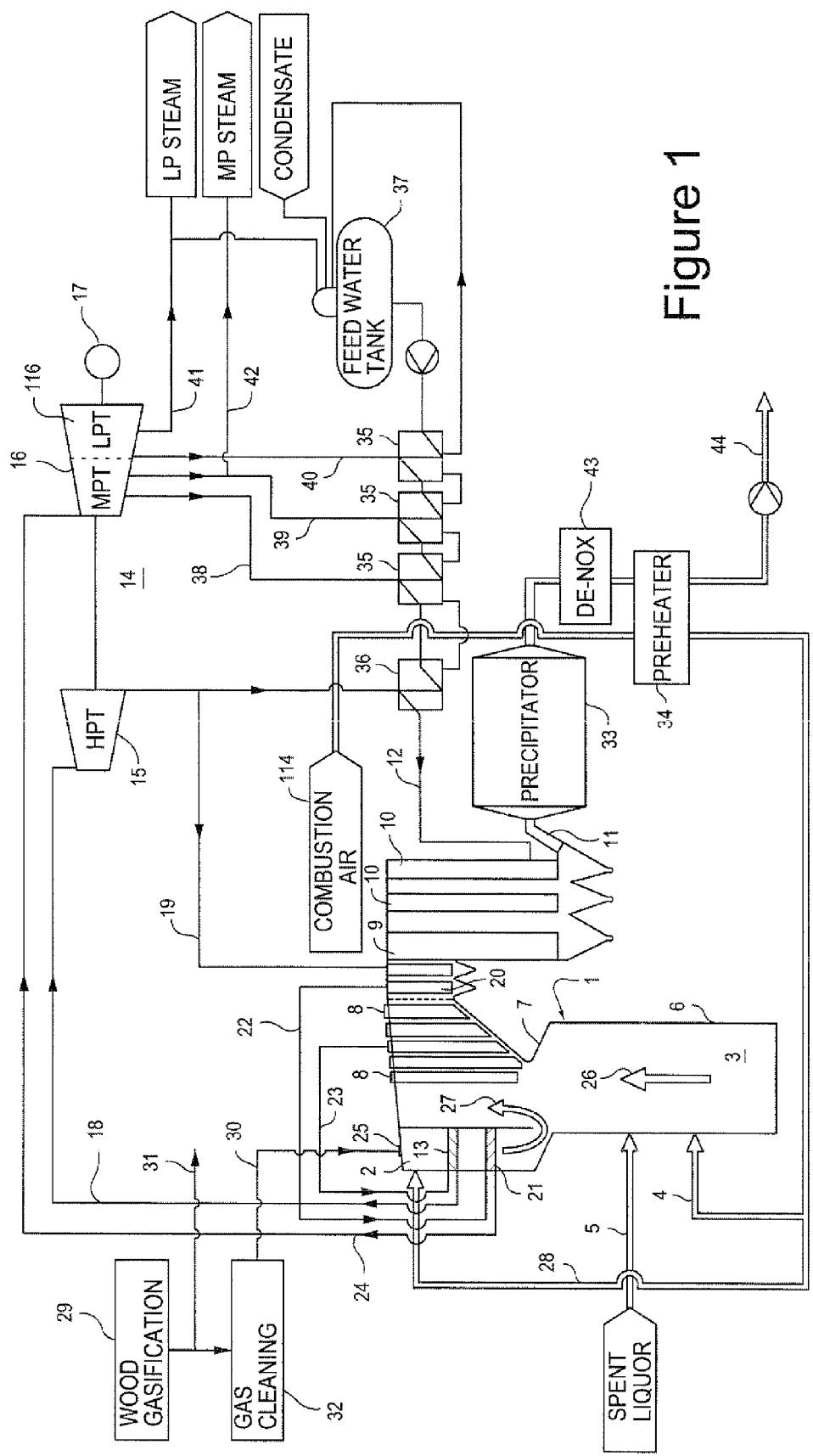
FIG. 1 is a schematic diagram of a recovery boiler in a kraft chemical pulp mill.

FIG. 1 shows a furnace 3 of a typical recovery boiler 1, such as a kraft recovery boiler, used for the combustion of black liquor, having a structure formed of a water-cooled tube walls 6. The water-steam mixture generated in this way is superheated in conventional superheaters 8 located partly in the shield of a "nose" above the furnace. In the superheaters 8 the heat of the flue gases 26 generated during black liquor combustion is recovered. Typically, a boiler bank 9 and economizers 10 serve as the after-heat surface in the boiler. After the superheater, the flue gases are directed into the boiler bank 9 and economizers 10.

The recovery boiler 1 includes a cavity 2 that may be arranged adjacent an upper section of a wall of the boiler. A furnace 3 of the recovery boiler generates flue gases 26 that flow upwards to and past a flow inlet from the cavity 2. Combustion air 4 is fed to the furnace to promote combustion, typically at several elevations, only one of which is shown. A liquor feeding line 5 provides black liquor that is fed to the furnace, preferably at an elevation above a primary combustion zone in the furnace. The walls 6 of the furnace are preferably water-cooled. A bullnose 7 in the boiler generally defines the upper regions of the combustion zone and the transition in the furnace to superheaters 8. The cavity 2 is opposite to and generally at the same elevation as the bullnose. Downstream of the superheaters, the flue gases pass through a boiler bank 9 and economizers 10 that all three recover heat from the flue gases. An exhaust conduit 11 allows flue gases to leave the boiler.

A fluid line 12 provides feed-water for the boiler, e.g., for the boiler bank 9 and economizers 10.

The cavity 2 may comprise a single chamber or a plurality of cavities that are arranged in parallel and/or serial. The cavity may share a wall with the furnace and the walls of the cavity may be water-cooled. Combustion gases generated in the cavity 2 flow into the furnace as additional flue gases 27. The cavity may include a superheater 13. Superheated steam flows via steam conduit 23 from the conventional superheaters 8 in the boiler to the superheater(s) 13 in the cavity (or cavities).

Superheated steam from the cavity superheaters 13 flows via steam conduit 18 to a steam turbine 14 that may include a high pressure stage 15, a medium-pressure stage 16 and a low-pressure stage 116. The steam turbine 14 may be a high pressure turbine (HPT) 15 separate from a two-stage turbine having the medium pressure turbine stage (MPT) 16 and low pressure turbine (LPT) stage 116. The turbine 14 drives a generator 17 that may produce electrical and/or mechanical power for the plant. The superheater 13 outputs steam via conduit 18 that drives the high-pressure turbine 15.

Steam from the high pressure turbine flows via conduit 19 to a first section of a reheater 20 in the stream of flue gas and between the superheater 8 and boiler bank 9. A second section 21 of the reheater receives steam via steam conduit 22 from the first reheater stage 20. The second reheater section 21 is in the cavity 2. Preferably, the second reheater is below the superheater 13 and is downstream in the path of flue gas 27 passing through the cavity. Steam from the second reheater section 21 flows via conduit 24 to the medium stage turbine 16.

The cavity 2 may include one or more burners 25. Flue gases (which may include hot combustion air) 27 formed in the cavity enter the furnace and combine with the flue gases 26 in the furnace of the recovery boiler. Combustion air 28 is injected into the cavity 2 to promote combustion of the burners 25. The burners 25 generally burn gas fuel generated in a gasifier 29 and that flows via gas supply conduit 30. The gas generated by the gasifier 29 may distributed 31 for other purposes in addition to providing fuel for the cavity burners 25. The gas from the gasifier may be cleaned or otherwise treated in a gas treatment device 32 before flowing to the burners.

The boiler exhaust conduit 11 allows flue gases to leave the boiler and enters an electrostatic precipitator 33 and then an emissions NOx treatment device 43, for example, a selective catalyst to reduce and/or oxidize nitrous oxides (de-NOx). The exhaust flue gases may also pass through a preheater 34 that heats combustion air 114, either with steam or with flue gases (this option is shown here). From the preheater 34, the flue gas may be exhausted to a stack 44.

Feedwater heaters 35, 36 receive feed water from a feed water tank 37. Exhausted steam from the high pressure turbine (HPT) provides heat energy for the feedwater heater 36 which provides water for the boiler. Exhausted steam 38, 39 from the medium-pressure turbine (MPT) and exhausted steam 40 from the low-pressure turbine (LPT) provide heat energy for successive stages of heaters 35.

Back pressure steam 41, e.g., low-pressure steam, exhausted from the turbine 14 may be provided for the mill and for the steam cycle. Similarly, extraction steam 42, e.g., medium pressure steam, may be exhausted from the turbine for the mill.

In the recovery boiler 1, steam pressure is such that excessive corrosion does not take place in the water-cooled tube walls of the furnace. The saturation temperature in water-steam emulsion plus the temperature difference due to incoming heat flux from the tube surface into water is less than 400-500° C., typically less than 400° C., which is the tube surface temperature. The steam temperature is increased over the typical figures by integrating into the conventional recovery boiler 1 a special combustion chamber or cavity 2. The steam is superheated in the conventional superheater 8 to such a degree that high temperature corrosion does not take place, e.g. 480-540° C., optimally 480-520° C. Then the steam 23 from the superheaters 8 is led to a superheater 13 located in the special combustion cavity 2 integrated into the recovery boiler, in which cavity the rest of the superheating up to 500-600° C., optimally to 520-560° C., takes place. The number of the cavities can be more than one. The generated high-pressure steam 18 is typically further directed to the high pressure stage 15 of a steam turbine 14 in order to produce electricity and process steams needed at the mill. The steam turbine has a high-pressure part 15 and a medium/low-pressure part 16.

In the cavity 2, a fuel is burned in order to produce heat for superheating steam. The fuel to be burned in a burner or burners 25 with flame is so clean or has such composition that it does not cause high temperature corrosion. Flue gases and excess combustion air 27 from the cavity 2 are introduced into the flue gas stream 26 of the recovery boiler. Preferably the flue gases from the cavity are directed through several openings in the wall of the recovery boiler, which openings may be on several heights, and located in the width direction in several locations.

The cavity 2 is included as a part of a conventional recovery boiler, so that the walls of the cavity are water-cooled as in the conventional part of the furnace, in the boiler bank and in other hot areas, and this cooling is integrated into a drum or drums of the conventional boiler with natural circulation. In once-through type boilers this integration means that the walls of the cavity are cooled by the water or steam flows of the once-through system. The same type of integration with circulation water is also valid for forced circulation type recovery boilers, if this arrangement is used. The main advantage is the introduction of heat from the cooling of the cavity into the same pressure water or steam flow or flows as in the main flow of the "conventional" part of the recovery boiler. Air 28 for the combustion can be taken from the "conventional" part of the recovery boiler or the cavity may be equipped with its own fans or compressors.

Preferably a combustion gas 30 for the cavity is produced in a gasifier 29 by gasifying biomass material. Preferably the fuel is solid wood-based fuels, such as wood, wood chips, bark chips, hogged wood, planer shavings, saw dust, wood-based forest residues. When biomass is used as fuel, the process can be improved significantly when the fuel is sufficiently dried. The total efficiency of energy production can be increased when the drying is based on the use of heat from flue gases of the recovery boiler, from smelt production, or from convection or radiation losses of the recovery boiler. The efficiency is improved also when combustion air needed is heated by utilizing the heat sources mentioned.

A part of the gases from the gasification is used in the cavity 2 as clean fuel 30 in the burner 25 to superheat the steam in the superheater 13 and also for re-heating purposes in the reheater 21. Part 31 of the gases may be used for other purposes at the pulp mill, such as in a lime kiln. If this type of fuel is not available, other fuel like natural gas, LPG, oil, methanol, liquefied biomass etc. can be used. The criterion for the fuel is the non-corrosive nature under the cavity conditions. This non-corrosive nature can be created in the gas from gasification 29 by cleaning the gas in a treatment 32. This treatment may include special filtering, catalytic processes, gas cooling etc.

The live steam 18 from the cavity 2 is expanded to a temperature of 250-400° C. in the high-pressure part of the turbine. The recovery boiler 1 is provided with a reheater 20, 21 for reheating the steam expanded in the turbine. Preferably the reheater has two stages or parts. The first stage 20 is located in the conventional superheater section of the recovery boiler where it is heated by heat of the flue gases generated in the furnace of the recovery boiler. Typically the first stage is disposed between the superheaters 8 and boiler bank 9. In the first stage the steam is typically reheated to 450-540° C., preferably to 450-500° C.

The second stage of the reheater is formed of a heat exchanger means located in the cavity 2. The steam reheated in the first stage 20 is led through line 22 to the second stage 21 in the cavity. The steam is further reheated to a temperature of 480-600° C., preferably to 490-560° C. The steam from the reheater is discharged from the cavity to the medium-pressure part 16 of the turbine 14, where the steam is expanded to back pressure. The steam is expanded, partially or totally, to condensing pressure, if the turbine 14 has a condensing part. The number of cavities can be one or more. According to an embodiment, at least two separate cavities are needed when the live steam final superheating and the reheating take places in separate places.

Steams of different pressures may be extracted from the turbine 14 through lines 38-42 and used for different purposes of the steam cycle, for instance for preheating boiler feed water in heaters 35-36, and for the needs of the mill.

The use of the system or method disclosed herein is not limited to the firing of a certain spent liquor, but it can be applied in connection with several spent liquors, such as spent liquors from a kraft pulping process and a soda pulping process. The basic shape of the recovery boiler does not have to be according to that shown in FIG. 1. For example, the number of the ducts where the heat transfer surfaces are located, can be in the main part of the recovery boiler from one to several. The shape of the cavity can vary as well. Further, the arrangement for feed water preheating and combustion air preheating shown in the FIGURE can also be modified and varied.

The invention is not intended to be limited to the embodiment illustrated and described above, but it can be modified and varied within the scope and spirit of the invention as defined by the following claims.

We claim:

1. A spent liquor recovery boiler in the pulp and paper industry comprising:
   a water or steam circulation system having superheaters, said circulation system being connected to a steam turbine comprising a high-pressure stage, and
   a furnace for burning spent liquor to produce flue gases, and including an upper portion through which the flue gases flow,
   wherein the steam or water circulation system is provided with a reheater for reheating steam from the high-pressure stage of the turbine, and the reheater further comprises a first section in flue gas generated by and flowing through the furnace and connected to a steam outlet of the high-pressure stage of the turbine, and a second section receiving steam from the first section and heated by a combustor separate from the furnace burning the spent liquor.

2. A spent liquor recovery boiler according to claim 1, wherein the recovery boiler is provided with at least one cavity separate from the furnace and having walls formed of water cooled tubes, said at least one cavity including the combustor that gene rates flue gases in the cavity, wherein the second section of the reheater is located in the cavity and receives steam from the first section of the reheater.

3. A spent liquor recovery boiler according to claim 2, wherein the turbine is provided with a medium-pressure stage, and the second section of the reheater is connected to the steam inlet of the medium-pressure stage of the turbine.

4. A spent liquor recovery boiler according to claim 2, wherein an interior of said at least one cavity is provided with a final superheater for final superheating of the steam generated in the boiler, wherein that the final superheater and the second section of the reheater are located in the cavity.

5. A spent liquor recovery boiler according to claim 1, wherein the combustor includes a plurality of combustors and the recovery boiler is provided with a first cavity having a one of the combustors and a second cavity having another of the combustors, each cavity having walls formed of water cooled tubes, and the combustor in each cavity combusts a fuel to generate flue gases in the cavity, wherein the first cavity includes the furnace burning the spent liquor to produce the flue gases, and the second cavity includes the second section of the reheater and wherein the second section of the reheater receives steam from the first section of the reheater in the first cavity.

6. A spent liquor recovery boiler according to claim 5, wherein the interior of the second cavity is provided with a superheater for final superheating of the steam generated in the boiler.

7. A spent liquor recovery boiler according to claim 5, wherein the first cavity and the second cavity are located on opposite walls of the recovery boiler.

8. A method of producing energy at a pulp mill having a recovery boiler and a turbine with a high-pressure part, said method comprising
   a) combusting spent liquor from a pulping process in a furnace of the recovery boiler to generate flue gases;
   b) recovering heat from the flue gases to produce steam in the recovery boiler;
   c) superheating the steam from step b),
   d) expanding the steam from step c) to a temperature in a range of 250° C. to 400° C. in the high-pressure part of the turbine, and
   e) wherein the recovery boiler is provided with a reheater, and the expanded steam from step d) is reheated to a temperature in a range of 450° C. to 600° C. in the reheater wherein the expanded steam is reheated in a first stage of the reheater by the flue gases from step a) and in a second stage of the reheater by heat generated by combusting a second fuel separately from the combustion of the spent liquor.

9. A method according to claim 8, wherein the recovery boiler is provided with at least one cavity, in which the second fuel is combusted to generate heat and flue gases, and the second section of the reheater is the at least one cavity.

10. A method according to claim 8, wherein the steam is reheated in the second to a temperature of 480-600° C.

11. A method according to claim 8, wherein the steam is reheated in the second to a temperature, preferably to 490-560° C.

12. A method according to claim 10, wherein the reheated steam flows from the second section of the reheater to a medium-pressure part of the turbine, in which it is expanded to back pressure.

13. A method according to claim 10, wherein the reheated steam is led to a condensing part of the turbine, in which it is expanded to condensing pressure.

14. A method according to claim 9, gasifying a wood or other biomass fuel to produce a combustible gas, cleaning and using the combustible gas as fuel in the cavity, wherein the cleaned combustible gas generates heat and flue gases to heat the second section of the reheater.

15. A method according to claim 9, wherein combustion air is fed into the cavity and a mixture of hot air and flue gases is formed in the combustion in the cavity.

16. A method according to claim 14, wherein a mixture of hot air and flue gases is led to the furnace of the recovery boiler to be used combusted in step a).

17. A method according to claim 13, wherein the flue gases generated in the cavity are mixed with the gases from step a).

18. A method according to claim 13, wherein step c) is partially carried out in the cavity.

19. A method according to claim 8 wherein the steam from step d) is reheated to a temperature in a range of 520° C. to 560° C.

20. A system for combusting spent liquor and generating steam comprising:
   a recovery boiler comprising a furnace combusting the spent liquor and having a flue passage for a flow of flue gases generated in the furnace by the burning of the spent liquor;
   a combustion cavity associated with the recovery boiler and including a burner combusting a second fuel distinct from the spent liquor;
   a first reheater in the flue passage and receiving expanded steam discharged from a first steam turbine, wherein the flue gases heat the expanded steam passing through the first reheating stage, and
   a second reheater in the combustion cavity such that gases generated by the combustion the second fuel heat steam in the second reheating stage.

21. The system in claim 20 wherein a superheater at least partially in the combustion cavity provides steam to an inlet to the first steam turbine.

22. The system in claim 20 wherein steam discharged by the first reheater flows to the second reheater.

23. The system in claim 20 wherein steam from the second reheater flows to a second steam turbine operating a pressure level below the pressure of the first steam turbine.

24. The system in claim 20 wherein the second fuel is generated by a wood gasifier.

* * * * *